Figure 1:
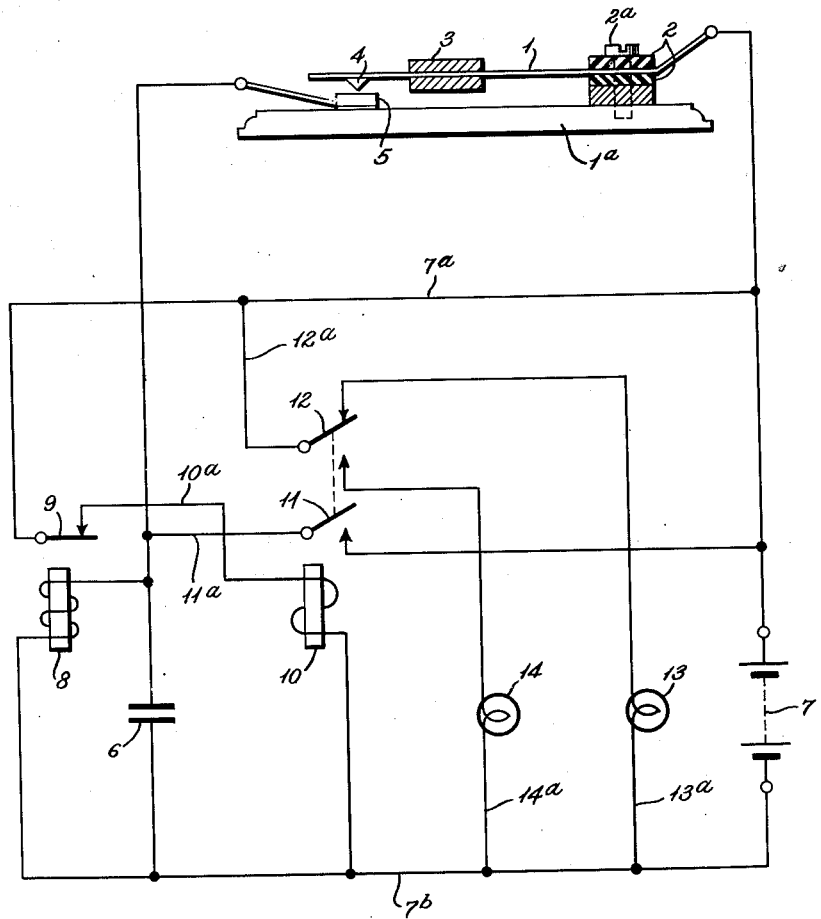

May 11, 1954     F. A. LOESCHER     2,678,430
AUTOMATICALLY OPERATING SYSTEM FOR
SIGNALING THE STOPPING OF VEHICLES
Filed Dec. 18, 1951     3 Sheets-Sheet 1

INVENTOR
Friedrich A. Loescher

BY Stevens, David, Miller & Mosher
ATTORNEYS

Patented May 11, 1954

2,678,430

UNITED STATES PATENT OFFICE 2,678,430

AUTOMATICALLY OPERATING SYSTEM FOR SIGNALING THE STOPPING OF VEHICLES

Friedrich A. Loescher, Oberursel (Taunus), Germany, assignor to Gertrude L. Hirsch née Loescher, Hohokus, N. J.

Application December 18, 1951, Serial No. 262,264

Claims priority, application Germany December 21, 1950

10 Claims. (Cl. 340—72)

The invention relates to an automatically operating system for signalling the stopping of vehicles, especially automobiles, whereby the operation of the warning-signal is started by a device which depends on the velocity of the car and operates the signal as soon as the vehicle is stopped or its speed drops below a certain value.

It is known to use a governor-switch, operated by centrifugal-forces and driven by a shaft from the motor of the vehicle to switch on the warning-signal when the velocity of the car drops below a certain value. This solution has the disadvantage that the mounting of the apparatus on vehicles which are already in service, is a difficult and costly procedure because of the necessity to attach the driving-shaft somewhere on the motor or the drive of the car. The invention hereafter described avoids the above mentioned disadvantage by using the vibrations of the car during driving-periods as criterion for the operation of the warning-signal. It further provides a new system for the generation of flashing-impulses for the warning-signal and combines the automatic-stop-signal with a new device for giving directional signals. The vibrating-device which may be considered as a slightly damped pendulum swinging in its natural frequency in a vertical plane, produces current-impulses out of the direct current supply from the battery of the car.

In contrast to the above mentioned device which uses a governor-switch operated by centrifugal-forces and two relays as an impulse-generator for the flashing-impulses according to the invention the current-impulses from the pendulum may be used directly to operate or release a signal. In the preferred embodiment of the invention however, the energy of these impulses is first accumulated in order to bridge short intervals where no vibrational impacts arrive, but during which intervals the start of the operation of the warning-signal is not allowed. As means of accumulation for the energy a condenser which charges fast from the battery and discharges slowly through a magnetic relay, or any other form of a delayed operating relay or apparatus which stores energy, may be used.

The generation of the flashing-impulses may be done in any known manner, for instance by a thermo-relay, but in the preferred forms of the invention a relay-impulse-generator with a new design is used. The warning-signal may be switched off by the current-impulses from the pendulum as long as these arrive, i. e. as long as the car is driven. One of the preferred embodiments of the invention however provides that the warning-signal stays permanently lighted without flashing-action as long as the car is driven and the flashing action is started as soon as the car stops. As warning-signal one or both rear-lights of the car may be used. When signal-arm-type directional signals are used on the car, their lamps may be flashed by the same generating-circuit as the rear-signals.

Instead of signal-arms, separate flash-lights on the front of the car or both, signal-arms and front-flashers, may be used.

Instead of special flashers on the front of the car, the head-lights may be used, flashing either an existing or an additional lamp in the head-lights for giving the directional signals. The flashes of the rear-signals may be "out of phase" with the flashes from the front-signals, or the flashes of the signal-arm-lamp, meaning that the lamp of the operating rear-signal is lighted while the lamp of the corresponding front-signal is dark and vice versa.

The whole apparatus, consisting of the vibration-sensitive device, the impulse-generator and, possibly, the switching-equipment, may be combined in one unit for mounting under the instrument-board of the car, or it may be divided into two or more units and placed in other suitable spots.

Further details of the invention may be seen from the drawings and in the following description of two different embodiments of signalling apparatuses, the first being a device for signalling stops only and showing clearly the principle of the automatic-signal for stops, the second showing a combination of the apparatus for signalling of stops using a new system for the generation of the flashing-impulses with a new system for giving directional-signals.

Fig. 1 shows the circuit of an automatically operating system to be mounted on the rear end of the car characterizing the stopped position of vehicles. This device needs only to be mounted in a suitable place and to be connected with one of the rear-lights or the light of the license plate. A leaf spring or blade spring 1 insulated by two insulating members 2, is held by a screw 2a to a base-plate 1a. The blade-spring 1 is mounted so that it may vibrate in a vertical plane when vibrational impacts meet the base-plate. On the upper side of the blade-spring 1 and near the end opposite the clamping a weight 3 is mounted which causes the spring 1 to vibrate at a given natural frequency, as soon as the device is moved by vibrational impacts. The free end of the spring has on its downside a contact-nipple 4 which is adjusted so as to maintain a small distance from a contact-plate 5 and is mounted insulated on the base-plate 1a. The counter-contact 5 limits the amplitude of the vibrations of the pendulum consisting of spring 1 and weight 3. The clamped end of spring 1 is connected to the plus-pole of battery 7. The insulated contact-plate 5 is connected to the coil of the magnetic relay 8, the other end of the coil of relay 8 being returned to battery-minus. In parallel with the coil of relay 8 a condenser 6 is connected. The capacity of condenser 6 is chosen such as to give relay 8 a considerable release-retardation. The release-retardation of relay 8, however, may be supplied by any other known means, for instance by means of a shortened turn or a copper-slug on the magnet-core of the relay. The relay 8 is connected to the battery 7 by another circuit 7a, 11a. In this circuit a relay-contact 11 is situated which is operated by relay 10. Relay 8 will draw current by this circuit when the pendulum does not generate impulses, i. e. when the car has stopped.

Both circuits feeding relay 8 are returned by the same wire 7b to battery-minus.

Between wires 7a and 7b, in parallel with the battery 7, a second relay-circuit 10a is connected. This relay-circuit consists of relay 10 in series with a relay-contact 9 which is operated by relay 8 and is opened when relay 8 is energized. A signal-light-circuit 13a is in parallel with the battery 7 being connected from wire 7a to wire 7b. It consists of a signal-lamp 13, preferably red, and a double-throw relay-contact 12 and is connected by wire 12a to 7a, the wire coming from the battery. Wire 13a connects it to 7b, the battery-return. A second-signal-lamp 14 is in parallel with the signal-circuit 13, 13a. The colour of the second signal 14 is chosen different from the main-signal 13 to give a striking effect. The second signal-light 14 may however be omitted completely when the flashing-action of signal-light 13 is considered sufficient. Relay 10 is slow-releasing too, this delay in action being formed by a copper-slug on the magnet-core.

The device drawn in Fig. 1 works as follows: When the vehicle on which the apparatus is mounted is in motion, the vibrational-impacts which are generated thereby, cause the blade-spring 1 with the hereto fastened weight 3 to swing at its natural frequency. The swing-contact 4, 5 is closed once during each cycle when the arriving vibrational impacts are strong enough to give the weight on the spring a sufficient momentum. Each closing and reopening of contact 4, 5 sends one current-impulse from battery 7 trough relay 8 and at the same time charges condenser 6. This charging action takes place in practically zero time as the internal resistance of the battery is very low and therefore the time-constant for the charging action is very small. The condenser 6 can only discharge through the coil of relay 8. This coil having a relatively high resistance, the condenser discharges slowly, that is, during 1 second or longer. If the natural frequency of the swinging-device is chosen relatively high, say i. e. 10 cycles per second, the charging of condenser 6 will be maintained constantly, and relay 8 stays in the energized position. This arrangement prevents the operation of the signal during short intervals during which no vibrational impacts arrive. Tests have proved, that even on the smoothest of roads, the arriving vibrational impacts are sufficient to cause the condenser 6 to be recharged in time before relay 8 is released. The relay 8 therefore stays permanently energized during driving periods. With its contact 9 it breaks the circuit of relay 10 and relay 10 cannot operate, its contacts staying in the position shown in the drawing. Signal-lamp 13 is lighted without flashing. Instead of an extra signal-lamp, the rear-lights of the vehicle may be used.

When the vehicle stops or its speed is reduced below a certain value and the vibrational impacts cease, spring 1 comes to a rest. The vibrational-constants and the amplitude of the spring may be chosen such as to operate swing-contact 4, 5 already when the vehicle is driven very slowly or even when only the motor is running, or they may be adjusted so as to operate only when the vehicle is driven above a certain predetermined speed. When the contacts 4, 5 are not operated during a period longer than the predetermined interval which is bridged by the charge of the condenser 6, a warning signal is given to the drivers of following cars, condenser 6 discharges in the aforesaid interval and relay 8 is released finally. Its contact 9 is closed now. Fig. 1 shows this moment. It is just one instant before the relays start to operate as an impulse-generator. The closing of contact 9 causes relay 10 to draw. Relay 10 switches over its contact 12 from the former position, where it had held lighted permanently signal-light 13, to its other position energizing now circuit 12a, 14a, i. e. switching on signal-light 14. At the same time, relay 10 closes its contact 11. The circuit of relay 8 hereby being closed again, relay 8 draws and opens a new contact 9. Relay 10 is cut off again but it will not be released instantly as it is made slow-releasing by the copper-slug on its magnet-core. It is released after this retardation-time is over and then switches back the flash-contact 12 into the position shown in the drawing. With its contact 11 it cuts the circuit of relay 8 and the cycle starts anew. As long as the car is stopping, contact 12 flashes the signal lamps 13 and 14 in turn. The length of the flash-intervals may be chosen by adjusting the release-retardation of relays 8 and 10.

Figure 2:
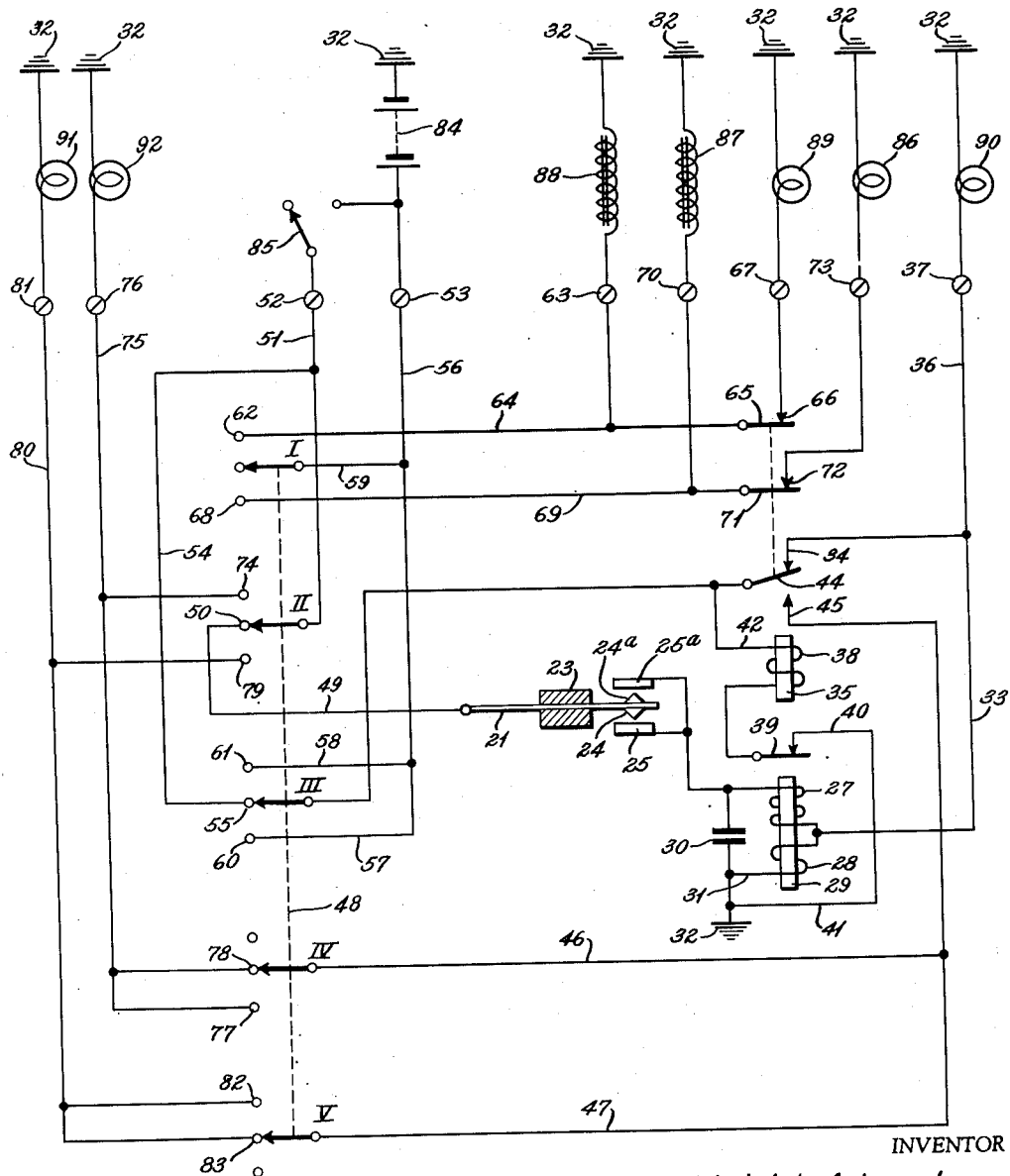

A modification of the system described above and including a new system for giving directional signals on the car is shown in Fig. 2. The pendulum used in this design is an improved form of the one described by Fig. 1. The blade-spring 21 is insulated and attached in a suitable manner, which allows it to vibrate in a vertical plane to a base-plate which is not shown in the drawing. On the blade-spring 21 is fastened a weight 23 in the vicinity of the end opposite the clamping. This end of the spring is further provided with a contact-nipple 24 on its down-side, opposite of which is situated on the upper side of the spring another contact-nipple 24a. The two nipples work together with the counter-contacts 25 and 25a which are connected in parallel. By means of a screw, the distance of the counter-contacts is made adjustable thereby making it possible to adjust the system easily to any wanted condition of operation, i. e. operation of the warning signal with the car completely at rest or start of operation when a predetermined speed is undergone. The same effect may be achieved by changing on the vibrating part the position where the weight is mounted. Each of the counter-contacts is brought into contact with the corresponding contact-nipple once during each half-cycle of the vibrations of the pendulum. The two counter-contacts 25 and 25a in parallel are connected by wire 26 to the winding 27 of relay 29. The winding 27 has a high resistance, for instance 1000 ohms, formed by many turns of small-size wire. Connected in series with the first winding 27 is a second winding 28. This second winding is low resistant, for instance 100 ohms. The number of the ampere-turns of the two windings however is made about equal. In parallel with the series-connection of the windings 27 and 28 is shunted a condenser 30 with a capacity of, for instance 500 microfarads. The ending 31 of the low resistance winding 28 is connected to ground, i. e. to the minus-pole of the battery 84 of, for instance, 6 volts. The junction of the windings 27 and 28 which are wound in the same direction is connected by wire 33 to relay-contact 34 which is operated by relay 35. Connection 33 is further wired by 36 to a binding-post 37. To this binding-post 37, a control-lamp 90 in the instrument-board of the car may be connected. The winding 38 on relay 35 has a low resistance, for instance of 60 ohms. The ending of this winding is returned to ground by contact 39, 40 and wire 41. Contact 34, 40 is operated by relay 29. The beginning 42 of the winding 38 of relay 35 is connected by wire 43 to the contact-spring 44 of a double-throw contact. This contact is operated by relay 35. In the rest-position of relay 35, contact 44, 45 connects the beginning 42 of winding 38 of relay 35 by wires 43, 46 and 47 to the movable arms of sections IV and V of a multiple-switch 48, the latter being symbolized in the drawing by a broken line. The blade-spring 21 of the pendulum is connected by wire 49 to contact 50 of section II of the already mentioned multiple-switch 48. In the position shown in the drawing, the movable arm of section II connects contact 50 by wire 51 to the binding-post 52. Binding-post 52 is connected outside the apparatus to the light-switch 85 of the car, therefore light-switch 85 connects plus-battery with the binding-post 52 as soon as the lights of the car are switched on.

Inside the apparatus binding-post 52 is connected by wires 51 and 54 to switch-contact 55 of section III of the multiple-switch 48.

The binding-post 53 which is connected outside of the apparatus to the plus-pole of the battery 84 is wired by connections 56 and 57 to a contact 60 of section III, by wires 56 and 58 to a contact 61 of section III and by wires 56 and 59 to the movable arm of section I of the multiple-switch 48. Contact 62 of section I is connected by wire 64 to the binding-post 63. Outside the apparatus, binding-post 63 is connected to the magnet-coil 88 of the right-hand arm-type directional signal. The other end of the magnet-coil is connected to ground. A contact 62 of section I of the multiple-switch is further wired by connection 64 and a branch of it to a contact 65, 66 which is operated by relay 35. The spring 66 of contact 65 is connected to the binding-post 67. To this binding-post outside the apparatus, a lamp 89 of the right-hand signal-arm-type directional signal or of the right-hand front-flasher of the car is connected, the other pole of the lamp being connected to ground. A contact 68 of section I of the multiple-switch 48 is wired by connection 69 to the binding-post 70. Outside the apparatus is connected to this binding-post one end of the magnet-coil of the left-hand signal-arm. The other end of the magnet-coil is connected to ground. Contact 68 of the multiple-switch 48 further is connected by wire 69 and a branch of it to relay-contact 71, 72 which is operated by relay 35. The contact-spring 72 of contact 71, 72 is wired to the binding-post 73. Outside the apparatus, to this binding-post the lamp 86 of the left-hand directional arm-type front-signal may be connected, the other pole of said lamp being connected to ground.

Contact 74 of section II of the multiple-switch 48 is wired by connection 75 to binding-post 76.

A branch of wire 75 connects contacts 77 and 78 of section IV of the multiple switch 48 with contact 74 and binding-post 76. Outside the apparatus a connection to the left-hand rear-light 92 of the car is made. The other pole of the rear-light is connected to ground.

Contact 79 of section II of the multiple switch 48 is wired by connection 80 to the binding-post 81. A branch of wire 80 connects contacts 82 and 83 of section V of the multiple switch to contact 79 of section II and binding-post 81. Outside the apparatus at this binding-post the right-hand rear-light 91 is connected, the other pole of the rear-light being connected to ground.

The impulse generator, consisting of relays 29 and 35 with condenser 30 in parallel with relay 29 and the latter having a tapped coil, has several advantages compared with known circuits. The first advantage is the generation of suitable impulses by two relays and only one condenser without any copper-slugs on the relays being needed.

The second advantage of the circuit is given by the resultant different time-constants of the flashing-impulses and the delayed action of relay 29 when energized by the swing-contacts of the pendulum-circuit.

The impulses needed for the flashers are best suited for the purpose when they occur from about ¼ to ½ second apart. The delay-time of relay 29 when operated by the pendulum-circuit during driving periods, however should be in the order of about one second or more to bridge short intervals during which no vibrational-impacts might arrive.

The relay-circuit works as follows: When operated by the pendulum-circuit, condenser 30 is charged immediately when the pendulum, caused by the vibration of the car gives only one short impulse. Condenser 30 begins to discharge through the series-resistance of the windings 27 and 28 of relay 29. Relay 29 is operated by this current. This current will be maintained by the condenser during about 2 seconds and the relay 29 will be in operation during this time. If new impulses arrive during this interval from the pendulum-circuit, the relay 29 is held operated permanently. If the car stops and the impulses from the pendulum cease, the relay-impulse-generator for the flash-signals starts to operate. The current now enters relay 29 by wire 33 at the junction of the two windings. Here, the current is divided, the stronger part flowing through winding 28 to minus, a ten times smaller amount flowing through winding 27 into the condenser which is discharged at this moment. Both windings having about the same number of ampere-turns (number of turns multiplied with the current flowing through them) the magnetic fields generated by them are about equal. These magnetic-fields however are opposite the coils being wound in the same direction but the current entering them at the junction where different ends meet. Therefore, at this moment the relay will not become energized as the two magnetic fields compensate each other to zero. The condenser 30 continues to be charged through winding 27. The more the charge grows, the more the charging-current is reduced. Finally a point is reached where the magnetic-field generated by winding 27 has become so weak that it is overcome by the magnetic-field of winding 28 and the relay will draw.

The resulting delayed drawing action of relay 29 forms one half-cycle of the flashing-impulses as it causes the relay 35 to stay in its drawn position during this interval. When finally relay 29 operates, its contact 39, 40 opens and relay 35 gets released. Contact-spring 44 is now switched over from contact-spring 34 to contact-spring 45 and breaks the connection by which relay 29 receives its energy. Relay 29 however is not immediately released as condenser 30 is partly charged, and discharges now by the series-circuit of windings 27 and 28, energizing relay 29 as long as the charge lasts. The resulting delayed release-action of relay 29 forms the other half-cycle of the flashing impulses.

By choosing the number of ampere-turns of winding 28 slightly larger than the number of the ampere-turns of winding 27, the impulses may be shortened, the amount of the difference being chosen such as to give any suitable duration of the flashing-impulses which is smaller than the delay-time given by the circuit of windings 27 and 28 in series with condenser 30 shunted in parallel to this series-connection.

The complete device shown in the drawing of Fig. 2 works as follows:

A. *Driving or stopping during day-time without giving directional-signals.*—The lights of the car are switched off, i. e. binding-post 52 has no connection with the plus-pole 53 of the battery 84. The multiple switch 48 is in the drawn position. None of the circuits is closed and therefore none of the signals is lighted.

B. *Giving directional-signals in daytime.*—The light-switch of the car is still switched off and therefore binding-post 52 has still no connection with the plus-pole of the battery. To give a directional signal, for instance for a right-hand turn, multi-section switch 48 is switched over to its right-hand position. Thereby the following circuits are closed:

On section I the plus-pole 53 of the battery gets connected by wires 56 and 59, the movable arm of section I, contact 62 and wire 64 to the binding-post 63. To this binding-post, outside the apparatus the magnet-coil 88 of the right-hand signal-arm is connected, the circuit being completed by the ground-return of the other end of the coil. The magnet-coil draws current and the right-hand signal-arm is operated.

A second signal-circuit is made by relay-contact 65, 66 which forms a branch-circuit between wire 64 and binding-post 67. To binding-post 67, outside the apparatus the lamp 89 of the right-hand signal-light which may be situated either in the right-hand signal-arm or in a right-hand front-flasher unit, is connected. The circuit is completed by the ground-returns of these lamps. If wanted, both, signal-arms and front-flashers, may be connected. As soon as the impulse-generator starts working, contact 65, 66 is closed and opened rythmically by relay 35 and the lamp of the right-hand directional signal is flashed. Section II of the multisectional-switch 48 is out of function during daytime because the light-switch of the car is not operated and binding-post 52 has no connection with plus-battery.

By section III of the multisectional-switch 48 in the right-hand position, relay 35 draws current by wire 43, the movable arm of section III, switch-contact 61 and the wires 58 and 56 which connect it to binding-post 53, i. e. the plus-pole of the battery, relay 35 draws.

By its contact 65 the first impulse is sent into the lamp of the right-hand directional signal. At the same time relay 35 switches over its contact 44. Thereby a circuit is broken by which for one short moment the right-hand rear-light had drawn current. This circuit consists of relay-contact 44, 45, wire 47, switch-contact 82, binding-post 81 and the lamp 91 of the right-hand rear-light with its other pole returned to ground. The double-throw contact 34, 44, 45 switching over from its position 44, 45 to position 34, 44, connects the junction of the windings 27 and 28 of relay 29 by wire 33, relay-contact 34, 44, the movable arm of section III of the multiple switch 48, switch-contact 61, wires 58 and 56 to binding-post 53, i. e. battery-plus. Relay 29 draws now, but, because of the two windings 27 and 28 and the condenser 30 shunted in parallel to the series-connection of both of them, after some delay as described above. Its contact 39, 40 breaks the circuit of relay 35 in its ground-connection. Relay 35 is released and now breaks with its contact 44 the circuit of relay 29. Relay 29 is slow releasing because of the condenser in parallel with its two windings. When relay 29 finally is released, its contact 40 is closed, relay 35 draws and the cycle starts again. By relay-contacts 65, 66 and 71, 72 of relay 35, impulses for the directional front-signals are generated, however only the one is operated which is switched on by the multisectional switch 48. By contact 44, 45 of the same relay, the wires 46 or 47, the movable arms of section IV or V of the multisectional-switch, switch-contacts 82 or 77 and the binding-posts 81 or 76 the rear-light which corresponds with the position of the multisectional switch gets current-impulses and is flashed. Relay-contacts 65, 66 and 71, 72 being open when relay-contact 44, 45 is closed and vice versa, the flashing action of the rear-lights and the front-signals corresponds herewith, i. e. the rear-signals are lighted when the front-signals are off and vice versa.

When signal-arm-type directional signals are used, the light of the signal-arm as well as that of the rear-signal is visible at the same time from a following vehicle and the "out of phase-action" of the two lamps makes the signal much more striking.

C. *Driving at night without giving directional signals.*—The light-switch 85 of the car is switched on, i. e. binding-post 52 is connected by the light-switch of the car to battery-plus.

Section I of the multisectional switch is out of service, the movable arm being in the center-position which has no connection.

The pendulum is connected to binding-post 52, i. e. battery-plus, by wire 49, switch-contact 50, the movable arm of section II of the multiple switch 48, wire 51 and light-switch 85. The vibrational-impacts generated during the driving, cause the pendulum to vibrate in a vertical plane. The pendulum-contacts 24 and 25 and the contacts 24a respectively 25a are continuously closed and opened at short intervals. The impulses generated by the swing-contacts charge condenser 30 continuously anew and relay 29 therefore stays operated as long as the vehicle is moving.

Relay 35 being cut off the battery by contact 39, 40 of relay 29 stays in the released position which is shown in the drawing. So, its contact 44, 45 is closed as long as the car is moving and both rear-lights are lighted without flashing, the circuits for this action being: battery 84, light-switch 85, binding-post 52, wire 51, switch-contact 55, the movable arm of section III of the multisectional switch, relay-contacts 44, 45 wires 46 and 47, the movable arms of sections IV and V of the multisectional switch, binding-posts 76 and 81 and rear-lights 92 and 91, respectively, to ground.

D. *Stopping at night.*—When the car is stopped, the lights being switched on and the multisectional switch in the center- or zero-position, the current-impulses generated by the pendulum cease and relay 29 is released after condenser 30 has lost its charge. Relays 29 and 35 now generate flashing-impulses as described under "B" and both rear-lights begin to flash simultaneously, signalling to following vehicles that the car in front has stopped.

E. *Giving directional signals at night.*—The lights of the car are switched on, so binding-post 52 is connected to battery-plus by the light-switch 85. The multi-sectional-switch may be switched over to the right-hand position for giving signals for a right-hand turn. The front-signals of the car are operated as described under "B."

By section II of the multi-sectional-switch the pendulum is disconnected from the battery. The relays 29 and 35 start generating flashing impulses as described under "B" after the charge of the condenser 30 is dissipated. On section II of the multisectional-switch now in the right-hand position a new circuit is made connecting battery-plus from binding-post 52 by wire 75 to binding-post 76 where the left-hand rear-light is attached.

In the left-hand position of the multisectional-switch the same happens for the right-hand rear-light, the circuit being now: binding-post 52, wire 51, movable arm of section II of the multisectional-switch, switch-contact 79, wire 80 and binding-post 81. The circuits described herein which come into function only at the night, cause the rear-light which is not to be flashed when giving the directional signals to stay lighted so that both sides of the rear-end of the vehicle are always marked by lights. The functions of sections I, II and IV and V of the multisectional-switch are the same as already described.

Figure 3:
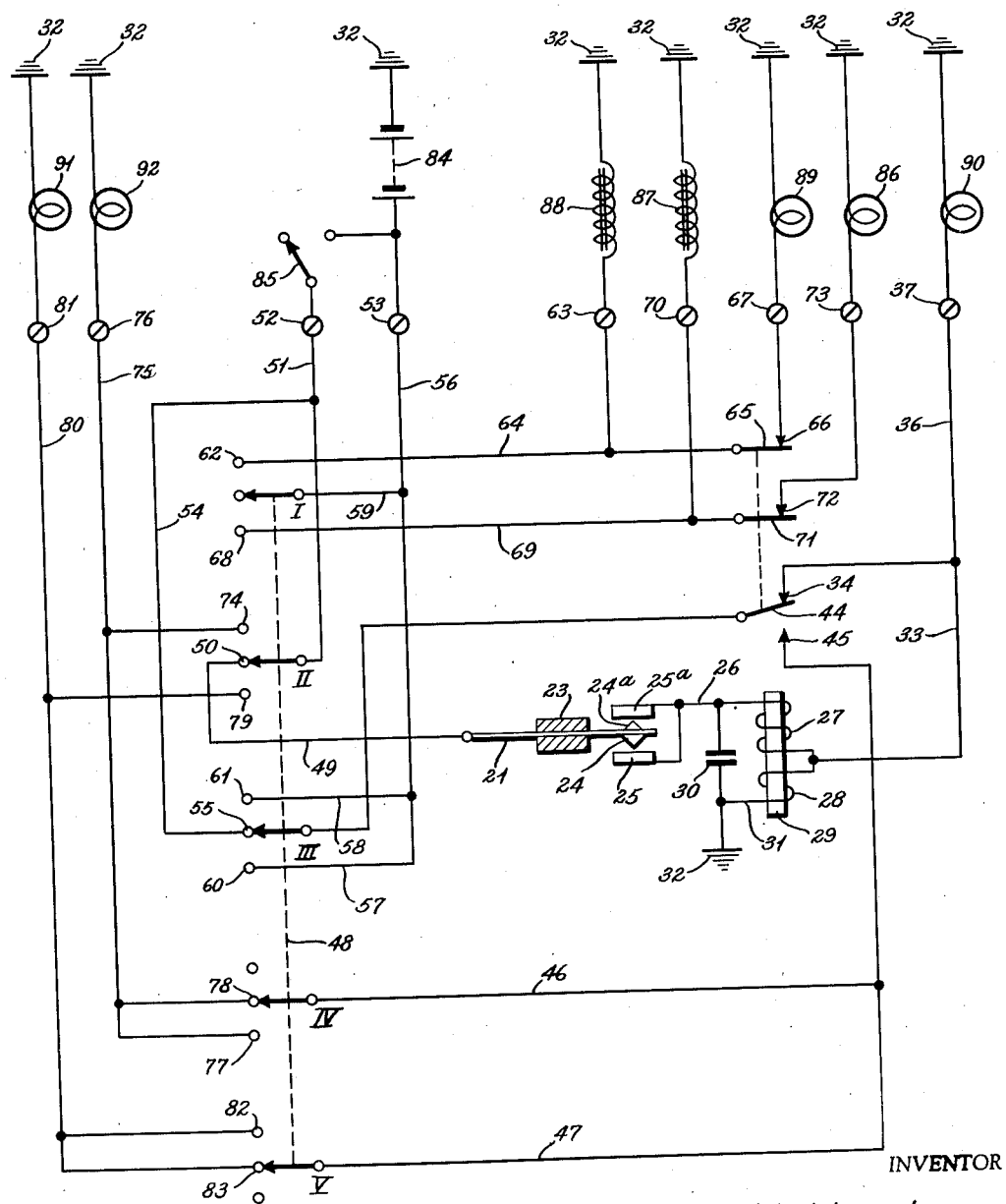

In Fig. 3 a third preferred form of the invention is shown.

This apparatus is a further developed form of the device shown in Fig. 2 and, concerning the design of the multiple-switching system and the construction and function of the vibrating device, is the same as shown and discussed in Fig. 2. The used relay-impulse-generator has been improved and uses only one relay instead of two. This relay (29) takes over all functions of the two relays (29 and 35) of the design of Fig. 2.

The impulse-generator of Fig. 3 is constructed and works as follows:

If the arriving vibrational impacts are strong enough, by contacts 24, 25 and contacts 24a, 25a respectively current-impulses are fed into the series-connection of the relay-windings 27 and 28 with condenser 30 in parallel.

For the generation of the flashing-impulses, the supply-circuit of the relay is fed from the movable arm of section III of the multisectional-switch 48 as soon as the vibrating device comes to a rest or switch 48 is operated to give a directional signal. In the supply-circuit of relay 29 its own double-throw contact 44, 34, 45 is situated which is shown in its rest position, i. e. the position it is in when relay 29 is not energized. By section 44, 34 of this said contact, relay 29 is fed when the generation of flashing-impulses is started. The feeding current gets divided into the windings 27 and 28 at the junction of the two windings where it is entering the relay. The operation of relay 29 is now the same as described in Fig. 2. By the current through winding 27 condenser 30 is charged. The windings 27 and 28 have about the same number of ampere-turns, but the generated magnetic fields are opposite because, seen from the junction, the currents through winding 27 and winding 28 have opposite direction. Relay 29 therefore will not draw immediately but only after some delay when the current through winding 27 which is charging condenser 30 has become so weak, that it may be neglected compared with the current through winding 28 which current has not been reduced. The delayed operation of relay 29 forms one half of the flashing-impulses. When relay 29 finally draws, its double-throw contact is switched over from position 44, 34 to position 44, 45. Thereby the supply-circuit is broken, however relay 29 is not released immediately because condenser 30 is partly charged. This delayed release-action of relay 29 forms the second half of the flashing-impulses. Contacts 71, 72 and contacts 65, 66 which are also operated by relay 29 generate the flashing-impulses for the front-flashers or the lamps of the magnetically operated arm-type signals or for both of them. Relay-contact 44, 45 generates the flashing-impulses for the rear-lights or feeds them without flashing during driving-periods when relay 29 is continuously operated by the circuit of the vibrating-device.

Having thus described the invention, what I claim as new is:

1. An automatically operating system for signalling the reduction of speed of a vehicle below a predetermined rate comprising means vibrating mechanically in a vertical plane, said means being adapted to perform a swinging movement in vertical direction in response to vibrational impacts caused by the movement of said vehicle, at least one electrical contact operatively connected to said vibrating means, at least one electrical countercontact touched intermittently during the operational periods of the vibrating device by said first contact, a feeder circuit connected to said contacts and a current source, an electrically operated signalling device connected to said feeder circuit, an automatically operating flash-signal circuit operatively connected to said signalling device, an energy-storing device in said flash-signal circuit and adapted to store current impulses transmitted by said feeder circuit during periods of vibration of the vibrating means and to transfer the stored energy of the impulses to the other parts of the flash circuit during short periods when no vibrational impacts arrive and therefore no current impulses arrive, at least one signalling device which is connected to said flash circuit and visible from the rear of said vehicle, the rest of said flash circuit comprising means adapted to switch on said signalling device when no current impulses arrive from said feeder circuit respectively when the current flow from said storing device ends, so as to start said signalling device to give warning signals when no vibrational impacts arrive during a predetermined period and therefore being dependent on the velocity of said vehicle.

2. An automatically operating system as claimed in claim 1 wherein said storing device is a condenser and the flash circuit includes a relay which is shunted in parallel with said condenser.

3. An automatically operating system as claimed in claim 1 wherein said vibrating device is so mounted between said two countercontacts connected to said feeder circuit that said countercontacts are touched at least once during each half-cycle of its vibrations by contacts operated by said vibrating device, the distance between said countercontacts being adjustable so as to adapt it to the amplitudes of said vibrating device.

4. An automatically operating system as claimed in claim 3 wherein said vibrating device consists of a blade spring bearing a weight whose place on said blade spring may be adjusted lengthwise to change the sensibility of the system against vibrational impacts.

5. An automatically operating system for signalling the reduction of speed of a vehicle below a predetermined rate comprising means vibrating mechanically in a vertical plane, said means being adapted to perform a swinging movement in vertical direction in response to vibrational impacts caused by the movement of said vehicle, at least one electrical contact operatively connected to said vibrating means, at least one electrical countercontact touched intermittently during the operational periods of the vibrating device by said first contact, a feeder circuit connected to said contacts and a current source, an electrically operated signalling device connected to said feeder circuit, an automatically operating flash-signal circuit operatively connected to said signalling device, an energy-storing device in said flash-signal circuit and adapted to store current impulses transmitted by said feeder circuit during periods of vibration of the vibrating means and to transfer the stored energy of the impulses to the other parts of the flash circuit during short periods when no vibrational impacts arrive and therefore no current impulses arrive, at least one signalling device which is connected to said flash circuit and visible from the rear of said vehicle, the rest of said flash circuit comprising means adapted to switch on said signalling device when no current impulses arrive from said feeder circuit respectively when the current flow from said storing device ends, so as to start said signalling device to give warning signals when no vibrational impacts arrive during a predetermined period and therefore being dependent on the velocity of the vehicle, and comprising pairs of illuminated directional signals spaced from each other and mounted on the outer surface of the vehicle, said directional signals being used as warning signals and connected to said flash circuit to give directional flash signals at one side of the vehicle when operated by the driver whatever the velocity of said vehicle may be, and to give automatically flashing warning signals on both sides of said vehicle when the velocity drops below a predetermined value.

6. An automatically operating system as claimed in claim 5 wherein the normally mounted rear lights of the vehicle are used to perform besides their normal function the task to give directional flash signals ahead of turns and warning signals when said vehicle slows down under a certain speed limit, said rear lights being connected to said flash circuit in such a manner that said directional flash signal is given when its switch is operated by the driver unconcerned of any existing illumination of said rear lights during night drives and unconcerned of the velocity of said vehicle.

7. An automatically operating system as claimed in claim 5 wherein the normal rear lights of said vehicle are used to give flashing warning signals when a certain speed limit is undergone and to announce turns at the rear of said vehicle when operated as directional signals by the driver, a further pair of directional signals which are visible from the front, said rear lights and said further pair of directional signals being so connected to said flash circuit that they afford directional signals when said switch is operated no matter what the speed of said vehicle is, in the case of unoperated directional signals and when said vehicle speed is reduced below a predetermined speed limit both said rear lights giving the warning signal.

8. An automatically operating system as claimed in claim 5 wherein the normal rear lights of said vehicle are used to give flashing warning signals when a certain speed limit is undergone and to announce turns at the rear of said vehicle when operated as directional signals by the driver, a further pair of directional signals which are visible from the front, said rear lights and said further pair of directional signals being so connected to said flash circuit that they afford directional signals when said switch is operated no matter what the speed of said vehicle is, in the case of unoperated directional signals and when said vehicle speed is reduced below a predetermined speed limit both said rear lights giving the warning signal, whereby said flash signals given by said different signal lamps are so timed that a lighted period of said rear signals falls on a dark period of the front or side signals and vice versa.

9. An automatically operating system for signalling the reduction of speed of a vehicle below a predetermined rate comprising means vibrating mechanically in a vertical plane, said means being adapted to perform a swinging movement in vertical direction in response to vibrational impacts caused by the movement of said vehicle, at least one electrical contact operatively connected to said vibrating means, at least one electrical countercontact touched intermittently during the operational periods of the vibrating device by said first contact, a feeder circuit connected to said contacts and a current source, an electrically operated signalling device connected to said feeder circuit, an automatically operating flash-signal circuit operatively connected to said signalling device, an energy-storing device in said flash-signal circuit and adapted to store current impulses transmitted by said feeder circuit during periods of vibration of the vibrating means and to transfer the stored energy of the impulses to the other parts of the flash circuit during short periods when no vibrational impacts arrive and therefore no current impulses arrive, at least one signalling device which is connected to said flash circuit and visible from the rear of said vehicle, the rest of said flash circuit comprising means adapted to switch on said signalling device when no current impulses arrive from said feeder circuit respectively when the current flow from said storing device ends, so as to start said signalling device to give warning signals when no vibrational impacts arrive during a predetermined period and therefore being dependent on the velocity of said vehicle, said flash circuit comprising two relays which, when energized, break one of the supply circuits of the other and which are adapted to operate in the needed fashion without any copper slug on their cores, the energy-storing condenser being connected in parallel with the full winding of one relay and determining the duration of the impulses generated by the relays, said full winding of the condenser-shunted relay consisting of two single windings wound in the same sense and connected in series, one of the windings being high-, the other low-resistant and both having about the same number of ampere turns and the current supply for the impulse-generator action of the system being linked to the joint of the two windings, the current impulses generated by the vibrating device being supplied at the beginning of the high-resistant winding.

10. An automatically operating system for signalling the reduction of speed of a vehicle below a predetermined rate comprising means vibrating mechanically in a vertical plane, said means being adapted to perform a swinging movement in vertical direction in response to vibrational impacts caused by the movement of said vehicle, at least one electrical contact operatively connected to said vibrating means, at least one electrical countercontact touched intermittently during the operational periods of the vibrating device by said first contact, a feeder circuit connected to said contacts and a current source, an electrically operated signalling device connected to said feeder circuit, an automatically operating flash-signal circuit operatively connected to said signalling device, an energy-storing device in said flash-signal circuit and adapted to store current impulses transmitted by said feeder circuit during periods of vibration of the vibrating means and to transfer the stored energy of the impulses to the other parts of the flash circuit during short periods when no vibrational impacts arrive and therefore no current impulses arrive, at least one signalling device which is connected to said flash circuit and visible from the rear of said vehicle, the rest of said flash circuit comprising means adapted to switch on said signalling device when no current impulses arrive from said feeder circuit respectively when the current flow from said storing device ends, so as to start said signalling device to give warning signals when no vibrational impacts arrive during a predetermined period and therefore being dependent on the velocity of said vehicle, said flash circuit comprising only one relay, the excitation coil of which consists of two single windings wound in the same sense and connected in series and the energy-storing condenser being shunted in parallel with the full winding formed by the two single windings in series and the one single winding having a high resistance, the other one a low resistance but the number of ampere turns of both windings being about equal and a contact operated by the relay itself being provided which supplies the current for the generation of the flash signals to the generating relay at the joint of the two single windings and the current impulses generated by the vibrating device being supplied at the beginning of the high-resistant winding.

References Cited in the file of this patent

UNITED STATES PATENTS

| Number | Name | Date |
|---|---|---|
| 1,201,564 | Daniel | Oct. 17, 1916 |
| 1,298,055 | Kershaw | Mar. 25, 1919 |
| 1,574,370 | Curtiss | Feb. 23, 1926 |
| 1,630,144 | Tollifson | May 24, 1922 |
| 1,846,966 | Hausse | Feb. 23, 1932 |